June 30, 1931.  K. DAVIS  1,812,085
AUTOMOTIVE MACHINE AND DISTANT CONTROL THEREFOR
Filed Sept. 8, 1926  13 Sheets-Sheet 1
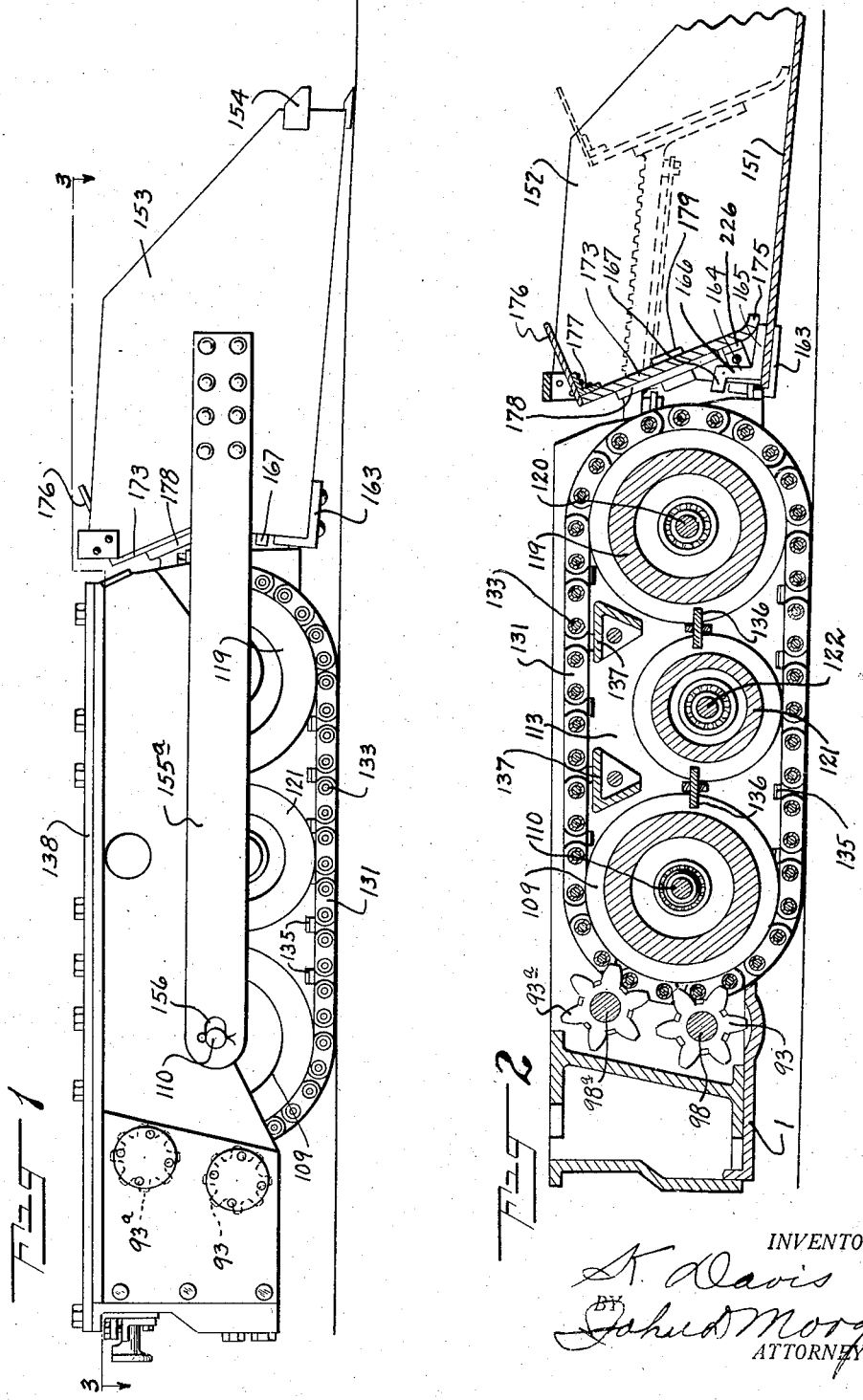

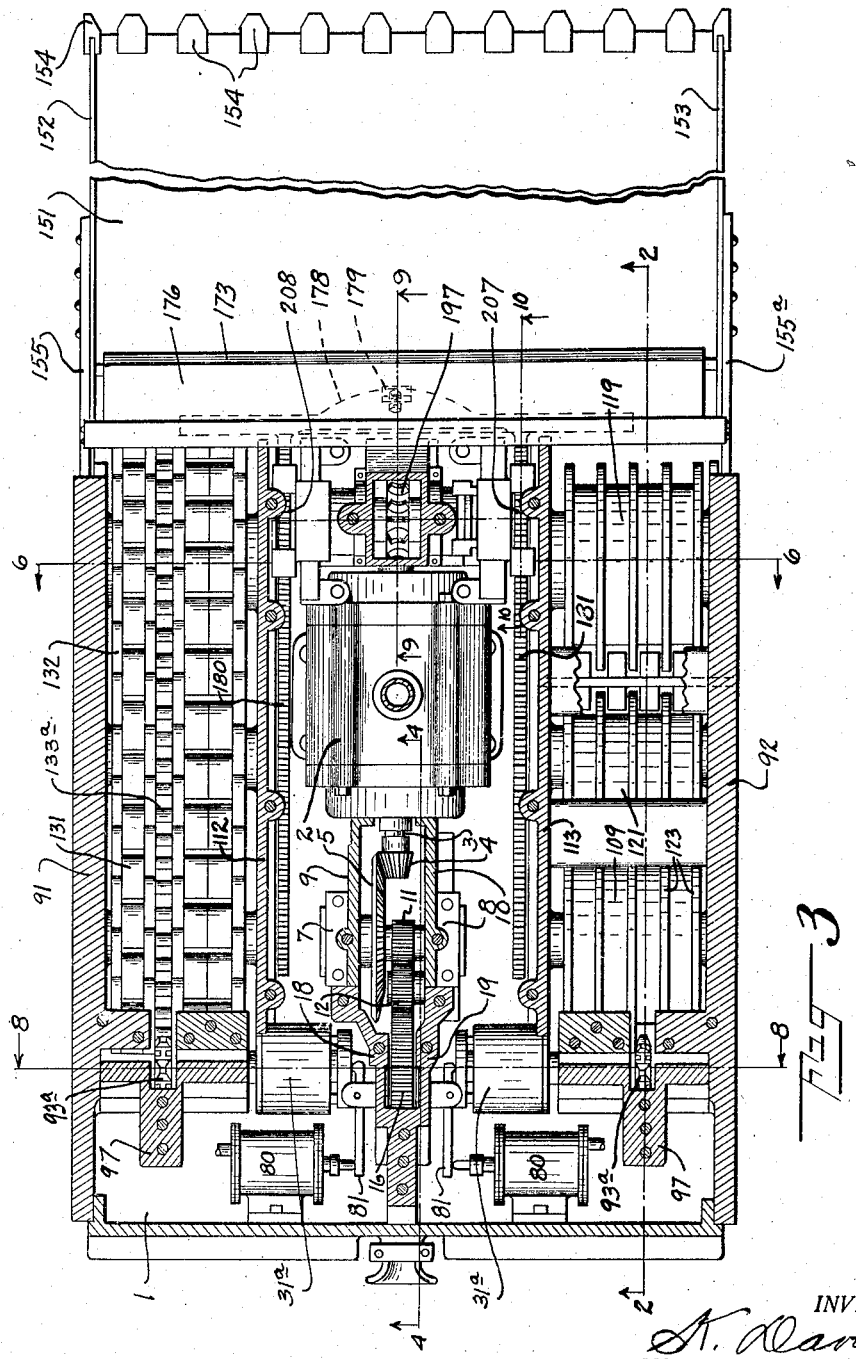

June 30, 1931.  K. DAVIS  1,812,085
AUTOMOTIVE MACHINE AND DISTANT CONTROL THEREFOR
Filed Sept. 8, 1926    13 Sheets-Sheet 3
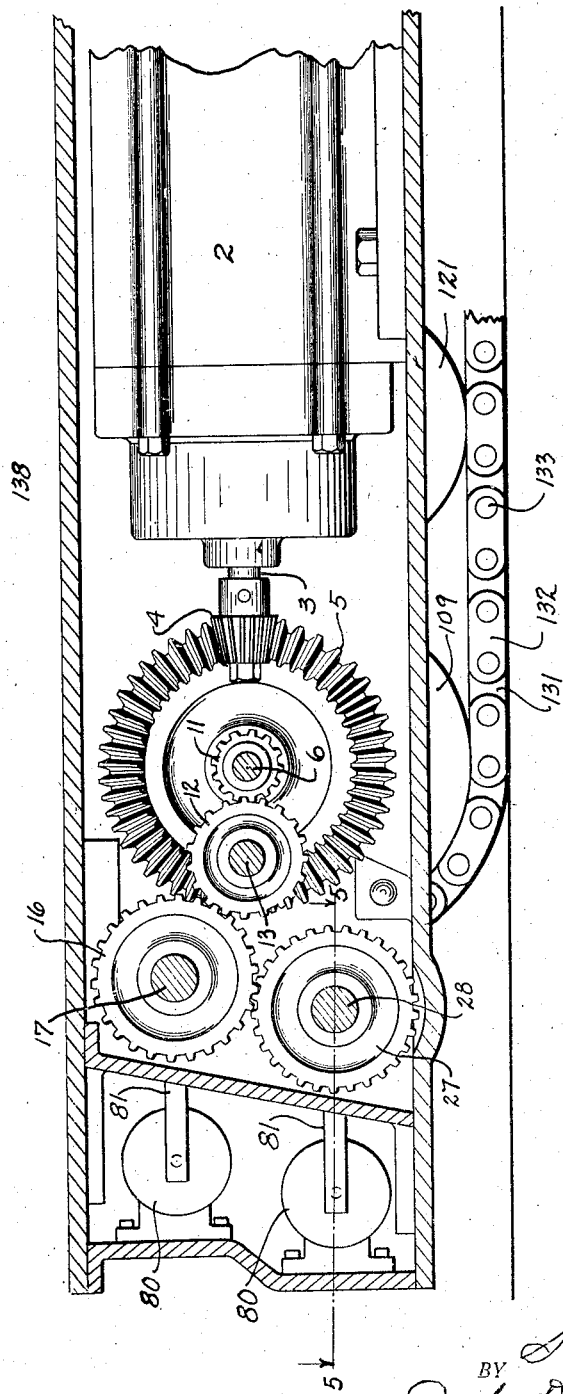
INVENTOR.
K. Davis
BY John D. Morgan
ATTORNEYS.

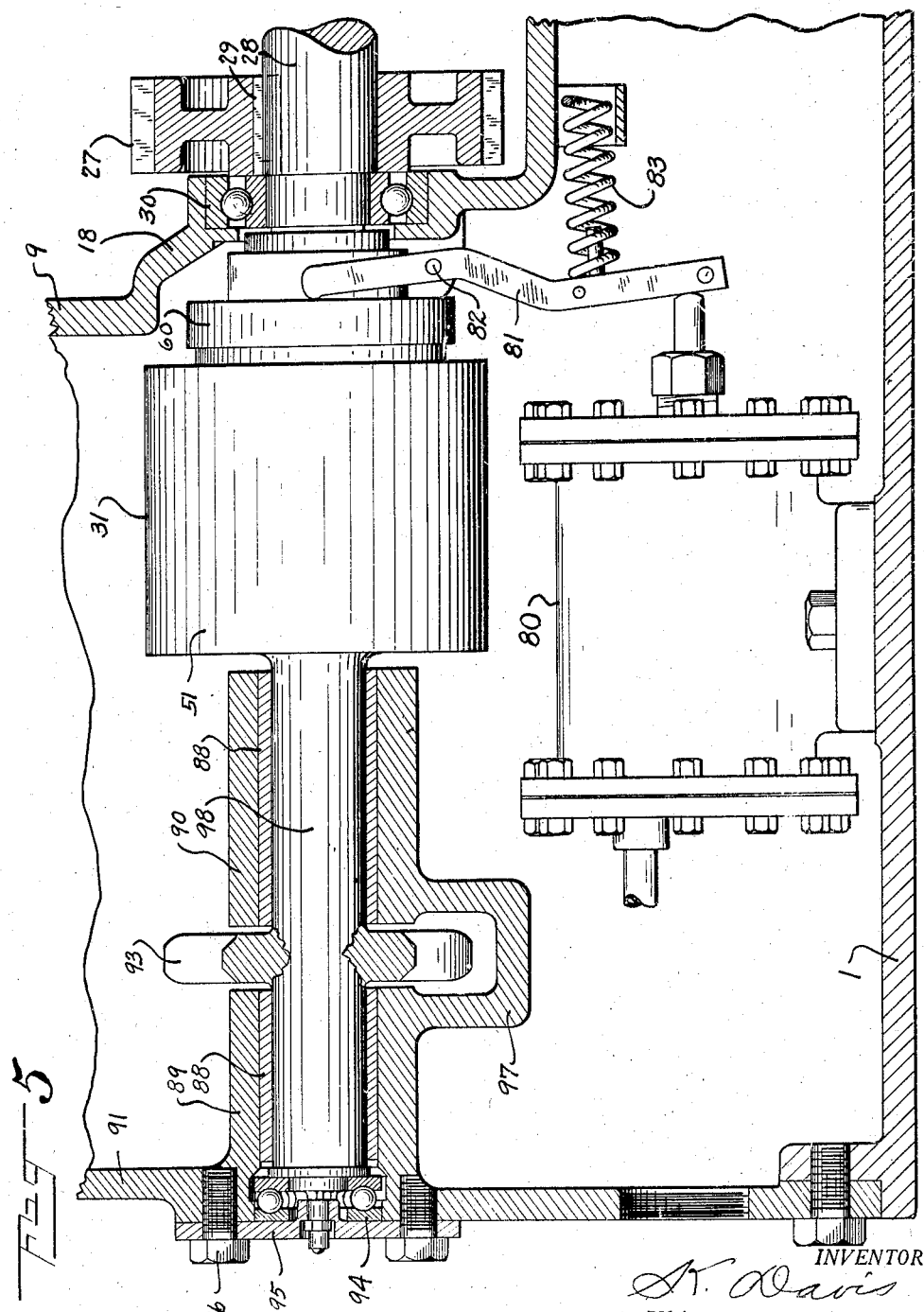

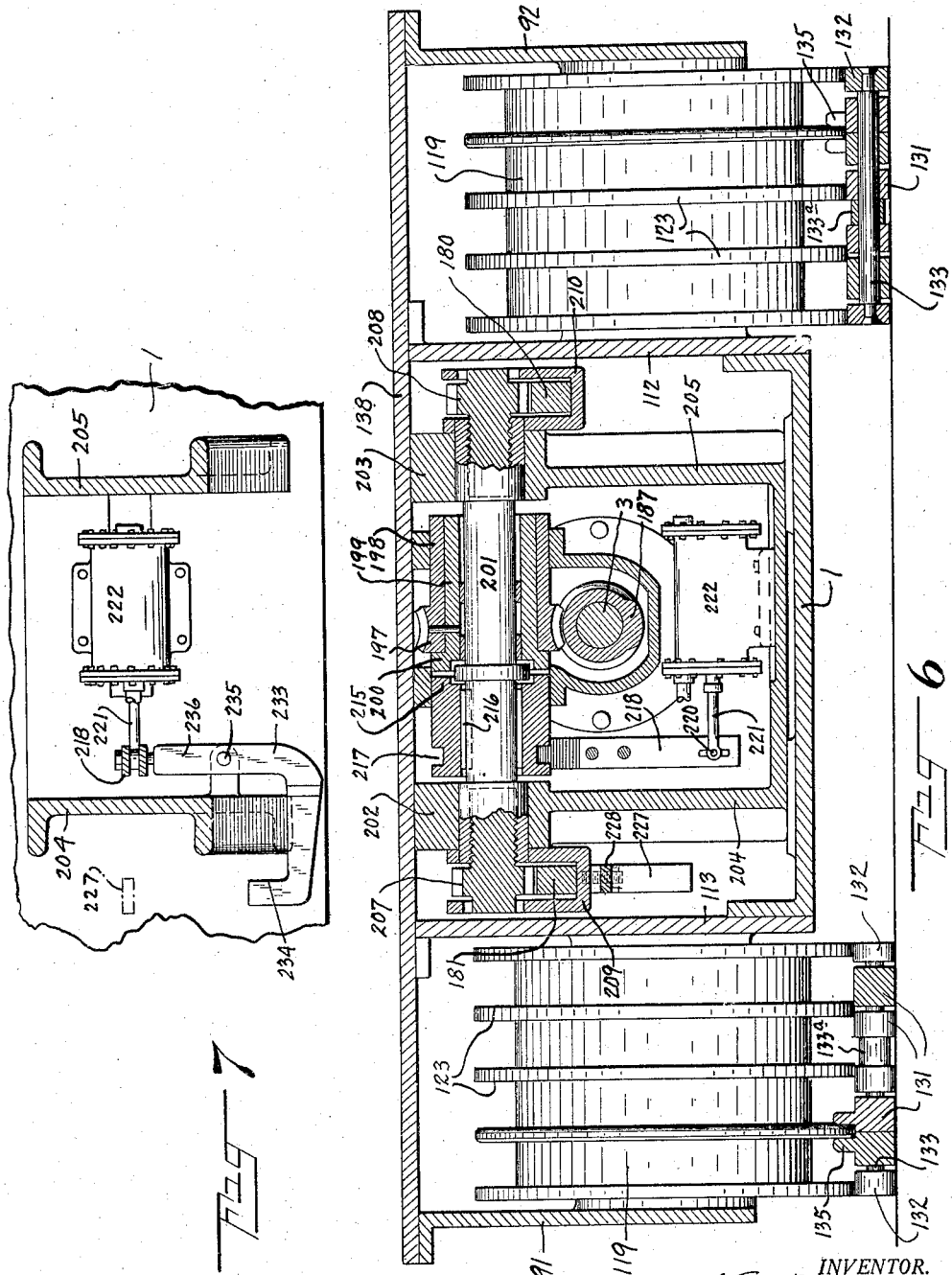

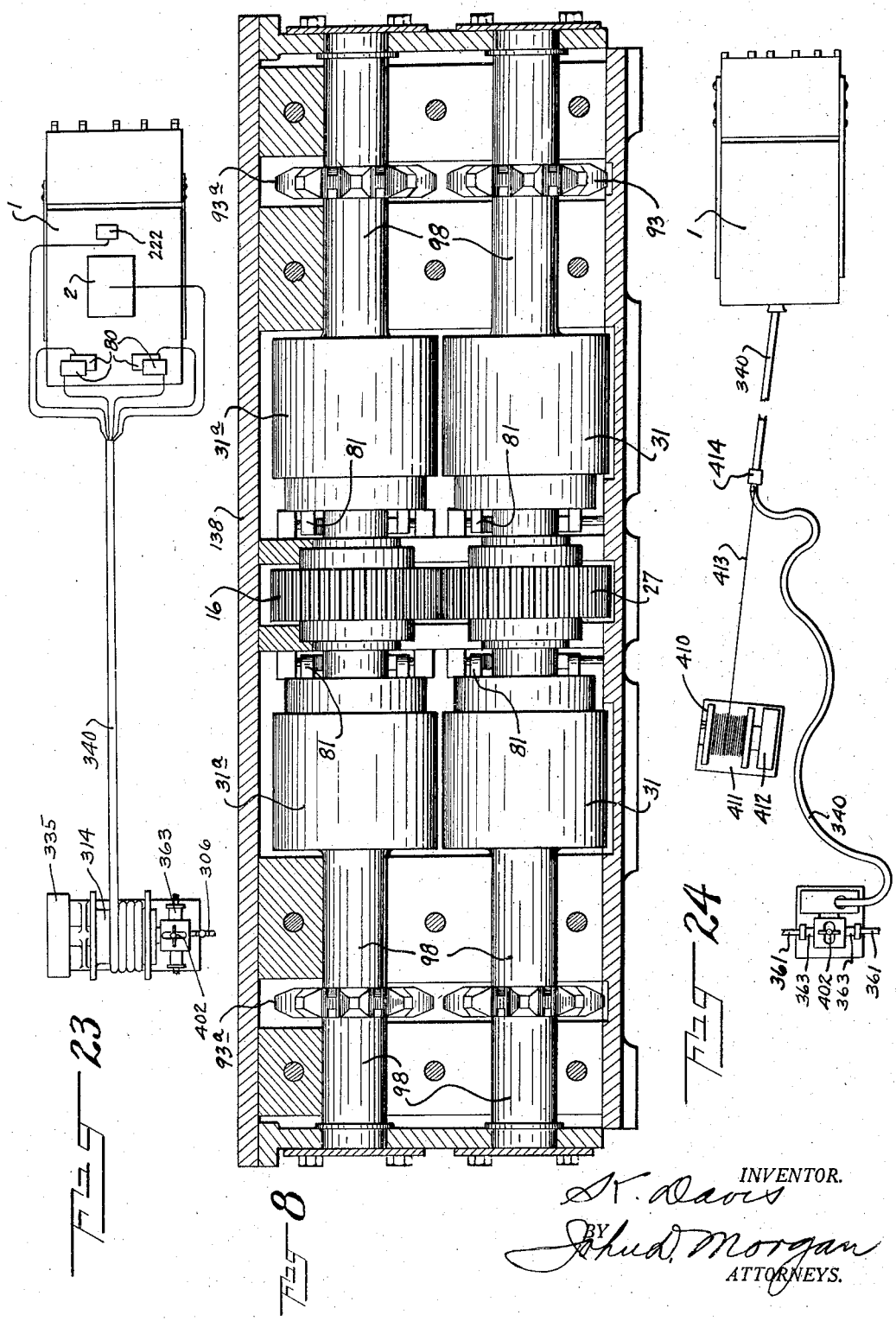

June 30, 1931. K. DAVIS 1,812,085
AUTOMOTIVE MACHINE AND DISTANT CONTROL THEREFOR
Filed Sept. 8, 1926    13 Sheets-Sheet 7
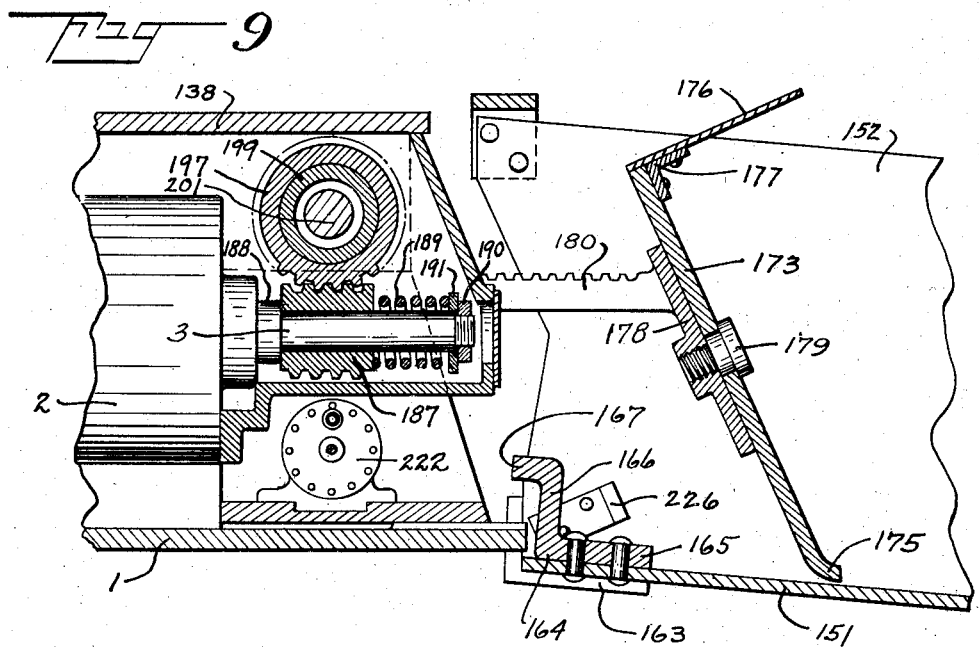
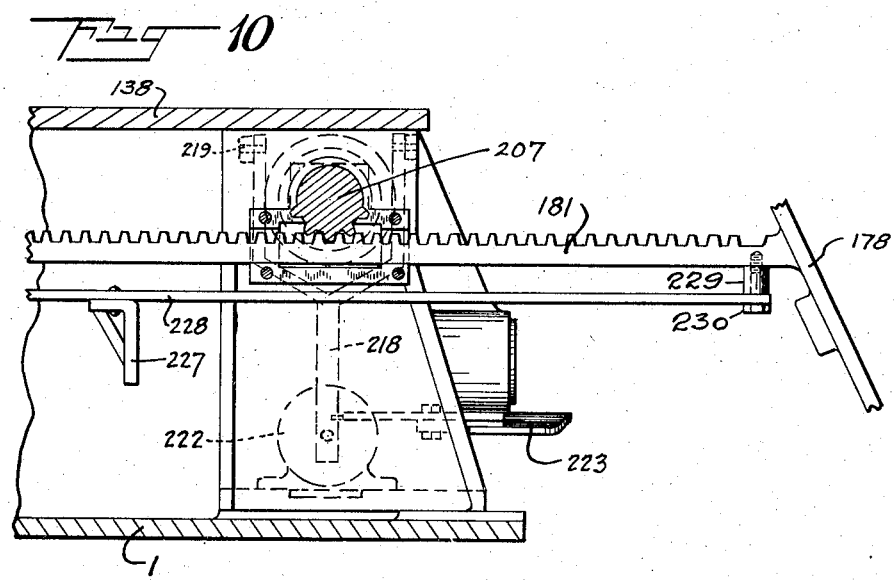
INVENTOR.
K. Davis
BY John D Morgan
ATTORNEYS.

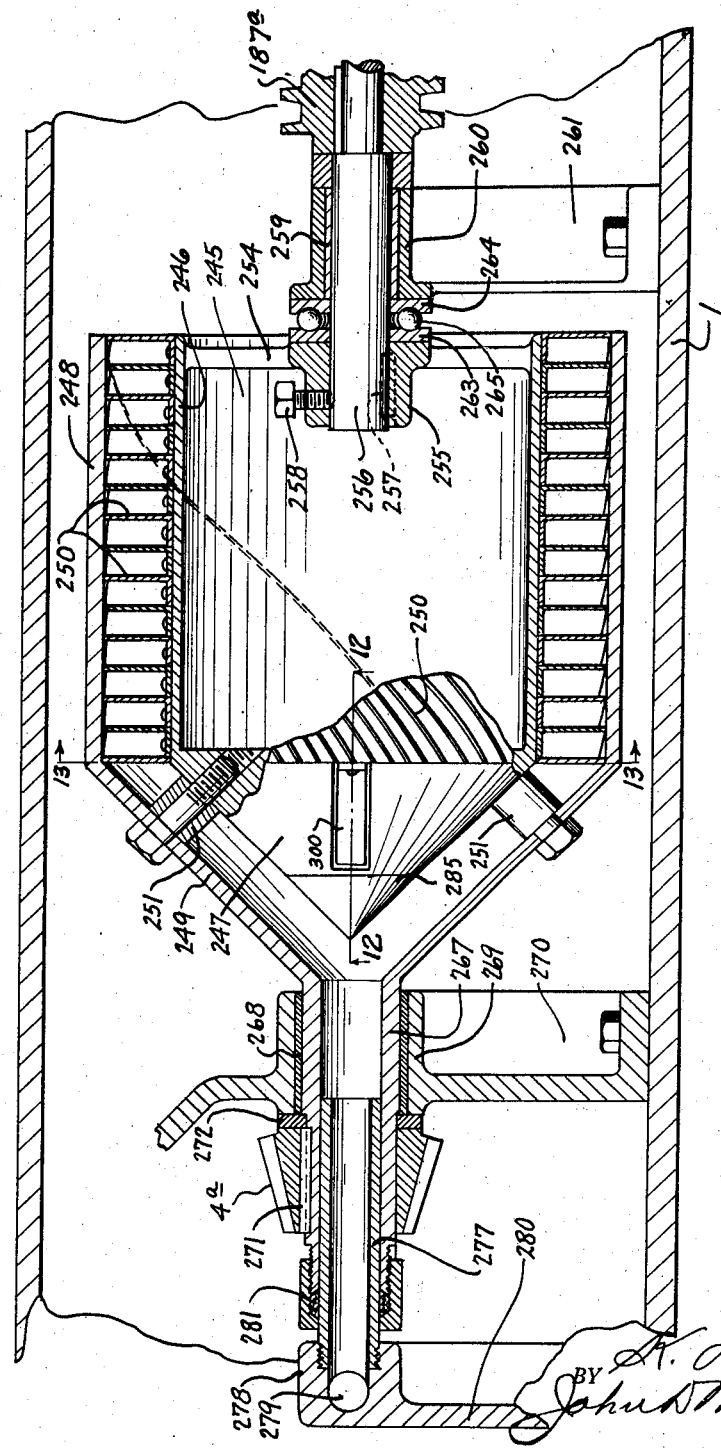

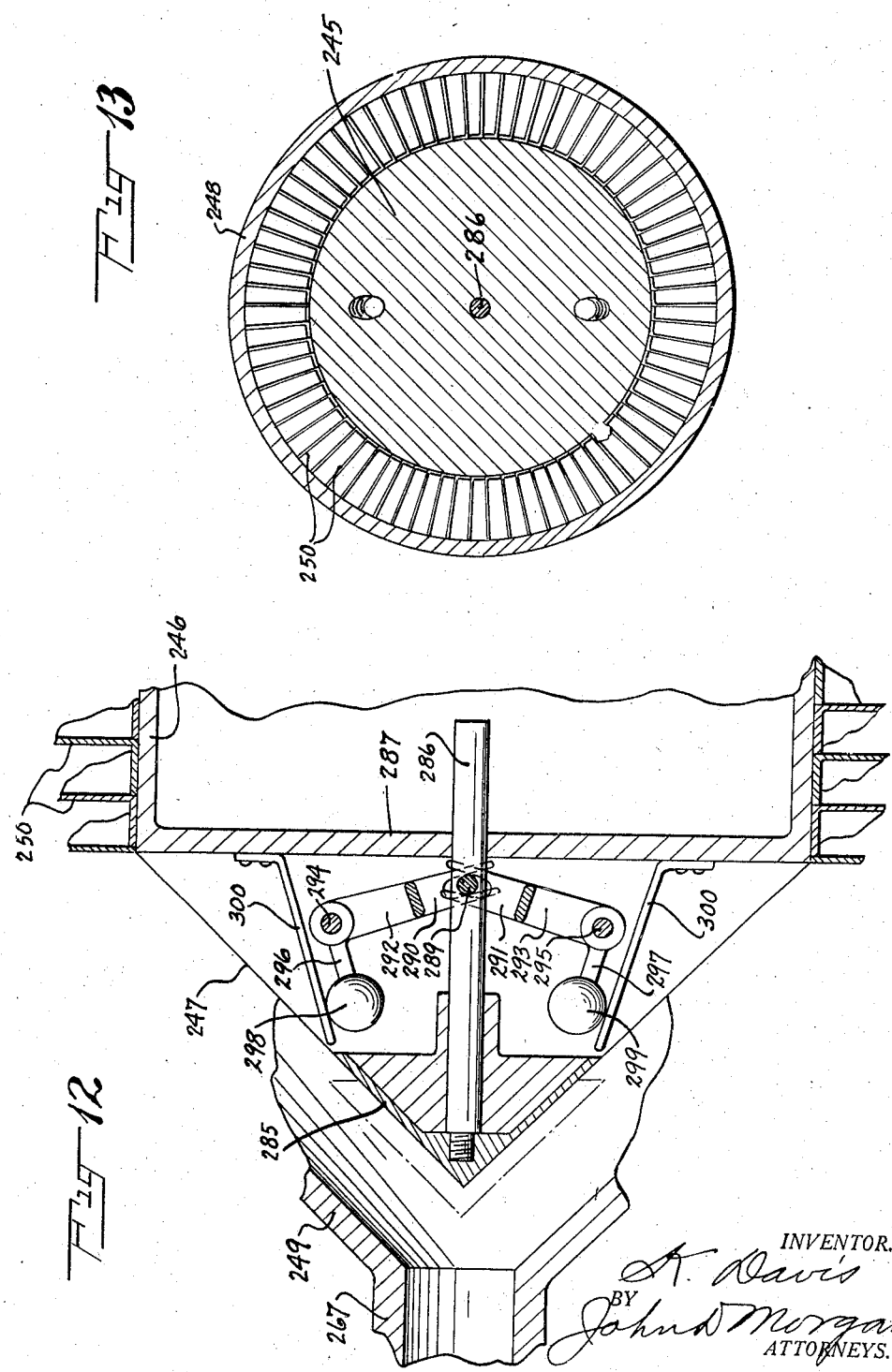

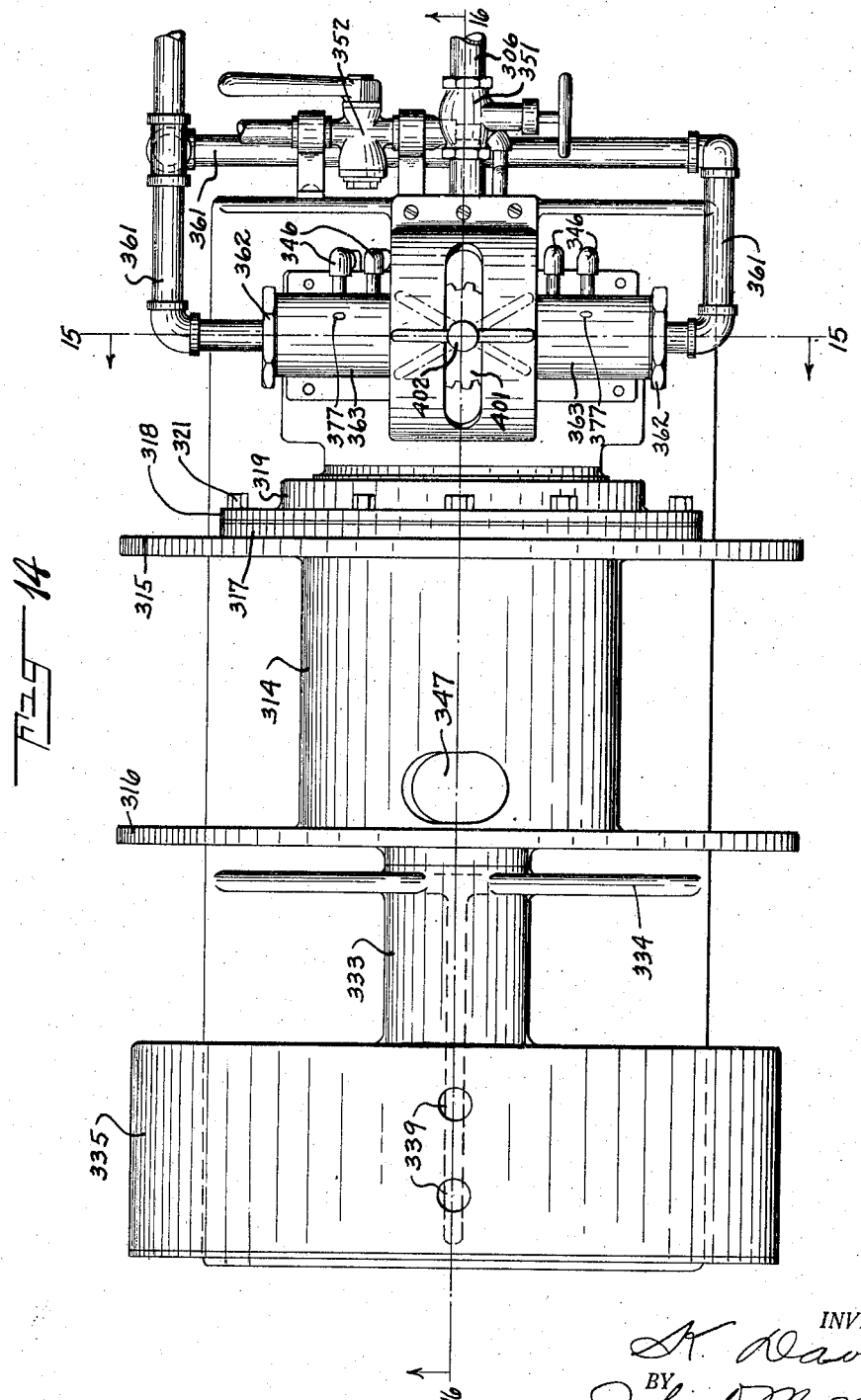

June 30, 1931.  K. DAVIS  1,812,085
AUTOMOTIVE MACHINE AND DISTANT CONTROL THEREFOR
Filed Sept. 8, 1926  13 Sheets-Sheet 11
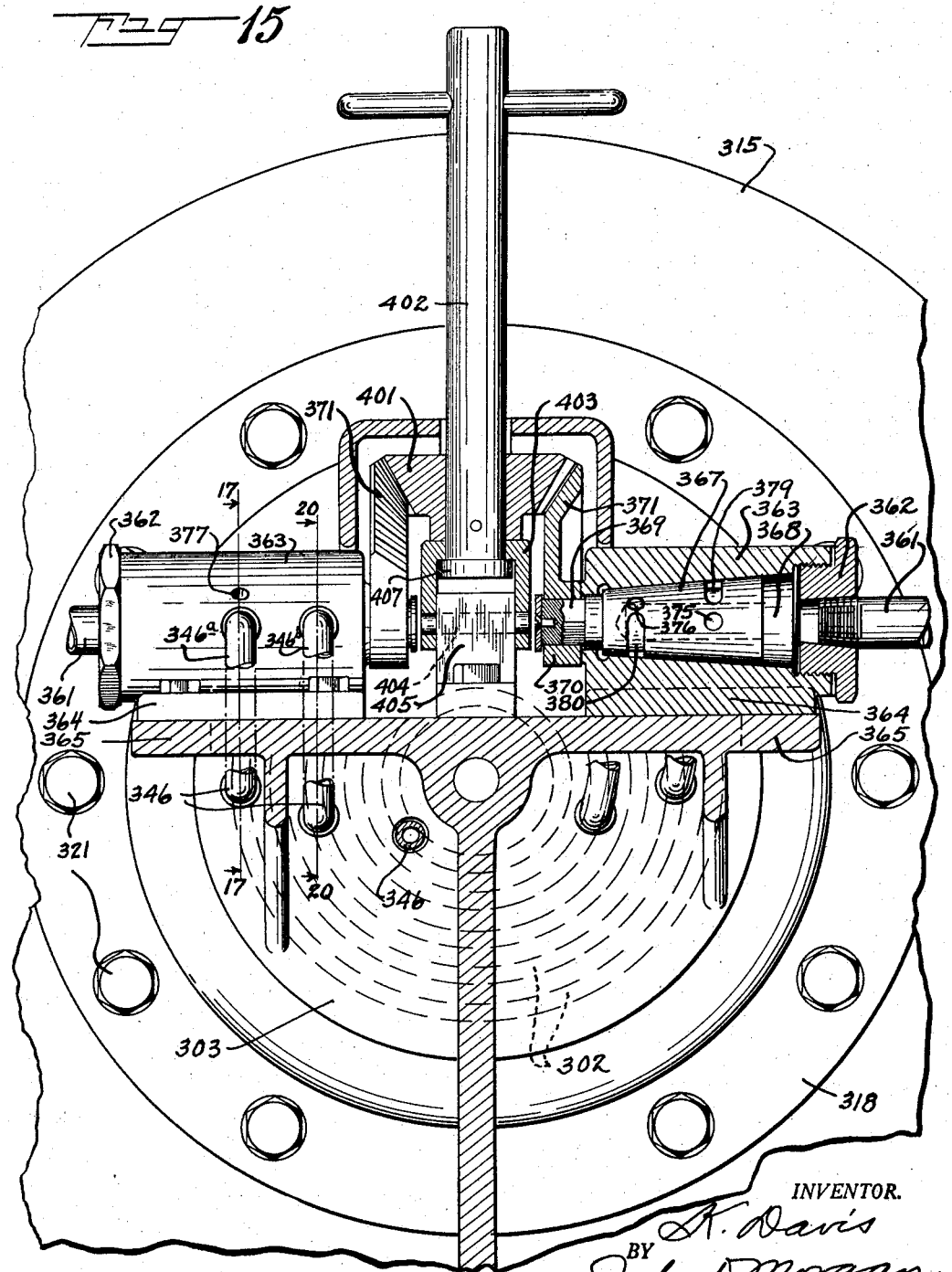

June 30, 1931. K. DAVIS 1,812,085
AUTOMOTIVE MACHINE AND DISTANT CONTROL THEREFOR
Filed Sept. 8, 1926  13 Sheets-Sheet 12
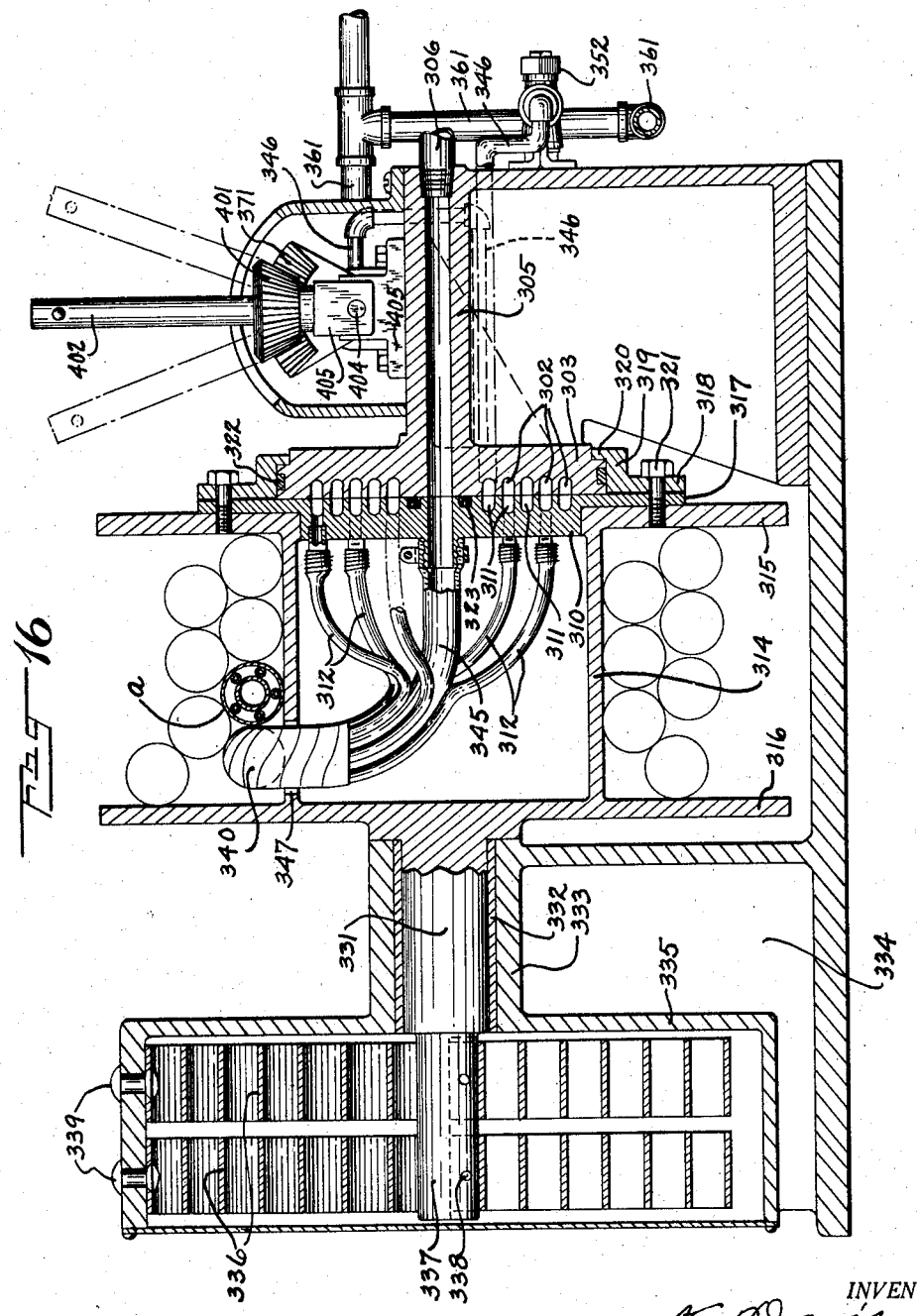
INVENTOR.
K. Davis
BY John D Morgan
ATTORNEYS.

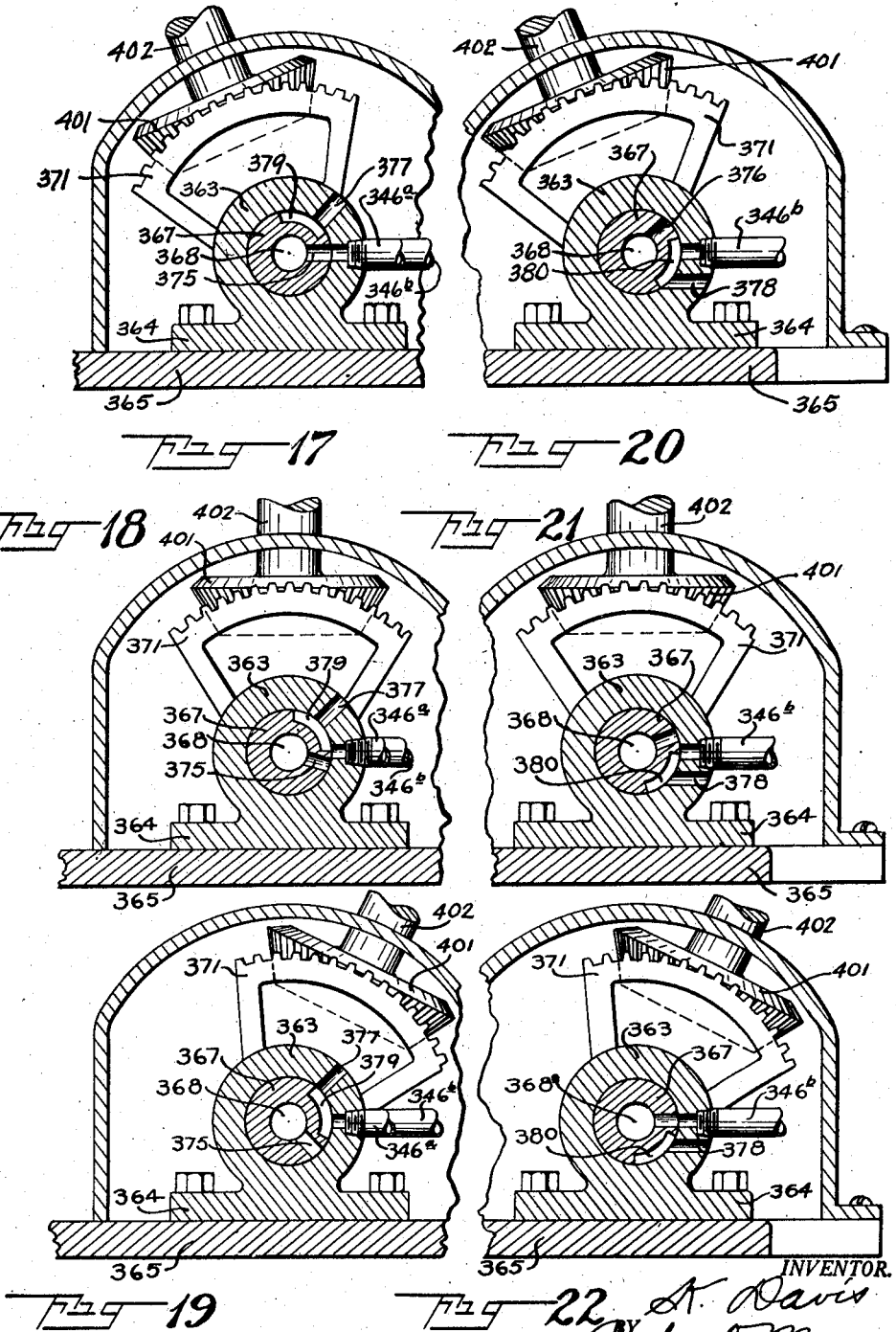

Patented June 30, 1931

1,812,085

UNITED STATES PATENT OFFICE

KENNETH DAVIS, OF ST. BENEDICT, PENNSYLVANIA, ASSIGNOR TO REMBRANDT PEALE, OF ST. BENEDICT, PENNSYLVANIA, W. SANDERS DAVIES, OF NEW YORK, N. Y., AND WILLIAM B. OAKES, OF RUTHERFORD, NEW JERSEY, AS TRUSTEES

AUTOMOTIVE MACHINE AND DISTANT CONTROL THEREFOR

Application filed September 8, 1926. Serial No. 134,219.

The invention relates to a distant and preferably stationary fluid-pressure operated control of the forward and backward travel and steering of an automotive and dirigible machine, and also to the fluid-pressure operated automotive and dirigible machine.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation of an automotive machine constructed in accordance with the invention;

Fig. 2 is a vertical longitudinal section, taken on the line 2—2 of Fig. 3;

Fig. 3 is a horizontal transverse section taken substantially on the line 3—3 of Fig. 1;

Fig. 4 is an enlarged fragmentary vertical section taken on the line 4—4 of Fig. 3;

Fig. 5 is a fragmentary enlarged, vertical, transverse section taken on the line 5—5 of Fig. 4;

Fig. 6 is an enlarged, transverse vertical section taken on the line 6—6 of Fig. 3;

Fig. 7 is a fragmentary, detached detail of the release for the shovel unloading plate;

Fig. 8 is an enlarged, transverse vertical section on the line 8—8 of Fig. 3;

Fig. 9 is a fragmentary, enlarged, vertical, longitudinal section on the line 9—9 of Fig. 3;

Fig. 10 is a fragmentary, vertical section taken substantially on the line 10—10 of Fig. 3;

Fig. 11 is a vertical, longitudinal section through an alternative form of motor;

Fig. 12 is a fragmentary section on line 12—12 of Fig. 11;

Fig. 13 is a vertical, transverse section on the line 13—13 of Fig. 11;

Fig. 14 is a top plan of the present embodiment of the fluid-pressure control;

Fig. 15 is an enlarged, fragmentary, vertical section taken on the line 15—15 of Fig. 14;

Fig. 16 is a vertical, transverse section on the line 16—16 of Fig. 14;

Figs. 17, 18 and 19 are fragmentary, sectional views representing three positions of one of the ports of the air pressure distance control valve mechanism taken on line 17—17 of Fig. 15;

Figs. 20, 21 and 22 are corresponding views of the other port of the same valve mechanism, taken on line 20—20 of Fig. 15;

Fig. 23 is a diagrammatic view of the entire mechanism of the preceding figures; and Fig. 24 is another diagrammatic view of a modified form of take-up for the air conduits.

The invention is directed primarily to the production of a stationary, fluid-pressure-operated distant control for a dirigible and automotive machine; and preferably, although not necessarily, in conjunction therewith a fluid-pressure-operated automotive machine, controlled in its backward or forward travel and steered by the fluid-pressure-operated distant control. It will be understood, however, that the dirigible and automotive machine itself may be operated by other than fluid-pressure motive power.

One highly useful and beneficial application of the fluid-pressure distant control, and also of the fluid-pressure-operated automotive and dirigible machine controlled thereby is in gas-laden mines. In such situations and under such conditions, the use of the two together gives perfect protection against accidental gas ignition from sparking, which danger constitutes a disbarment of electrically-operated machines from many such mines.

The invention in its broader aspects is further applied to such a distant, fluid-pressure controlling means and to such a fluid-pressure-operated automotive and dirigible machine, adapted to take up a large mass of loose material, weighing many hundreds of pounds, to separate the mass from the pile, and without tracks or other external guiding means, to guide and convey it to a place of discharge and there to eject it, usually to some other means of conveyance.

In thin seam mining, one of the most valuable applications of the invention is in taking up large masses or quantities of shot-down coal at the room face, conveying such masses, under the guidance of the distant control to the route of a skip conveyor, or other conveyor, and there automatically discharging the conveyed coal to such conveyor. This, however, is only an exemplary application of the invention.

With the fluid pressure distant control and the fluid-pressure-operated machine all danger of igniting explosive gases in mines is avoided. Furthermore, in the present embodiment, the necessity for the attendant to travel on the machine in the low seams is likewise avoided, and the use of any electric motors with the danger of gas-ignition from sparking brushes is avoided.

The invention as now preferably exemplarily embodied comprises as its main features a frame having endless traction treads at either side thereof, and preferably a fluid-pressure-operated motor for driving the treads. In the driving connections between the motor and the endless traction treads are interposed a plurality of clutches, and these clutches are thrown in and out selectively, and partly alternatively, by fluid-pressure-actuated means, the fluid pressure being controlled from a distant, and preferably stationary, point.

The fluid pressure control comprises a series of pressure fluid conduits, going to the respective clutch-actuating devices, and controls for the floor of the pressure fluid located at the distant station, whereby the attendant may turn on and off the fluid pressure from one or more of the clutch-actuating devices, to produce the desired motion or direction of the controlled machine. There is also preferably included in the distant control device a conduit for the pressure fluid, for driving the motor with a controlling means for this located also at the distant station. The pressure fluid which will usually be employed is air, and in certain of its aspects the invention is limited to air pressure, while in other aspects thereof the invention is not so limited.

The distantly-operated, fluid-pressure control is preferably applied not only to the endless traction treads, whereby either of these may be driven in either direction and independently of each other, to progress the machine either forwardly or backwardly and to steer the machine, but also to the mechanism for unloading the mass of material at the selected place of discharge. As embodied, a fluid-pressure-operated clutch controls the movement of a pusher plate within the shovel and is driven by the machine motor to eject the material from the shovel. If desired, the fluid pressure will act directly on the shovel pusher instead of applying the motor power thereto.

The foregoing general description of the main features of the invention, and the following detailed description of the construction and operation of the present embodiment, are explanatory and exemplary of the invention, but are not restrictive thereof.

Referring now in detail to the embodiment of the invention, illustrated by way of example in the accompanying drawings, the machine is provided with a bed plate 1, upon which the motor and the drives therefrom for the traction treads and the shovel discharging plate are mounted. The motor 2, which drives both traction treads in either direction, and also operates the shovel discharging plate is mounted on the bed plate 1.

The reversible and independently operable drive for the traction treads, as embodied, comprise a bevel pinion 4 fixed on the rear end of the motor spindle 3, which pinion meshes with a bevel gear 5, fixed on a shaft 6, journaled at 7 and 8 in vertically-disposed, side-by-side frame members 9 and 10 mounted on the bed plate 1.

Fixed also on the shaft 6 (Fig. 4) is a pinion 11, which meshes with an intermediate gear 12, fixed on a stub shaft 13, which shaft is supported in the frame member 10. The idle gear 12 meshes with a gear 16, fixed on a shaft 17, journaled at 18 and 19 in a rearward extension of the vertically-disposed frame plates 9 and 10. The shaft 17 has air-controlled clutch connections to both endless traction treads, at either side of the machine, to drive these treads in a given direction, either forwardly or backwardly. The clutches could be worked by hand, if desired.

For the purpose of driving the endless treads in the opposite direction, as embodied, a gear wheel 27 is in mesh with the gear wheel 16 (thereby rotating in the opposite direction), and gear 27 is fixed on a shaft 28, likewise journaled in the rearward extension of the vertically-disposed frame plates 9 and 10. This shaft 28 likewise has air-controlled clutch connections with driving means for both of the endless traction treads at either side of the machine.

There is thus provided connections from the motor whereby the endless traction treads may be driven either together or separately, and also independently of each other, in either direction, thereby providing means for driving the machine either forwardly or backwardly, or in straight or irregular paths, and enabling it to wheel or turn about an internal center or axis.

Referring now to the drive from each of the gears 16 and 17, respectively, to both endless traction treads, a detail description of one of these will be sufficient for all (see Figs. 2, 3, 4, 5 and 14). Taking for example gear wheel 27, it is fixed on shaft 28 by key 29. Shaft 28 has preferably a ball-bearing journal 30 in the rearward extension of the side frame member 9, the shaft extending outwardly therefrom (as best shown in Figs. 3 and 5). At this outward extension of the shaft 28, is a multiple-disc clutch mechanism 31, and an air cylinder control therefor.

The air control for the foregoing clutch mechanism comprises a yoked lever 81, pivoted on a support at 82, the forked end thereof bearing against the external circular face of the member 60. A compression coil spring 83 impels the lever 81 to the non-clutching position. The air-actuating means may be of any desired or suitable kind, so far as concerns the main features of the invention.

As embodied an air cylinder with the usual piston or dash pot arrangement is shown in which air is admitted into the cylinder on one side of the piston to perform the required work and exhausted from the cylinder to allow the piston to retract to its inoperable position.

The driving connections from the clutch to the corresponding endless traction tread, as embodied, comprise a shaft 98, fixed to or integral with the housing 51 of the clutch 31, and journaled in a friction sleeve or sleeves 88, mounted in a long bearing 89 and 90, integral with or supported by the bed plate 1. There are vertically-disposed, longitudinally-extending side frames 91 and 92, respectively, at either side of the machine. Fixed on shaft 98 is a sprocket wheel 93, which engages with the traction tread to drive it. At the external end of the shaft 98 a ball thrust bearing 94 is provided in the respective side plate 91 or 92, having an external cap plate 95 fastened to the vertical frame member by bolts 96. The sprocket has preferably a partial housing 97.

As already explained, for the purpose of reversely driving one traction tread, there are on one side of the machine, two clutch mechanisms 31 and 31ª, driven respectively from pinions 16 and 27 through the corresponding shaft 28. There are likewise, at the opposite side of the machine, two corresponding clutch mechanisms 31 and 31ª, similarly driven, for reversely driving the other traction tread. Each of these clutch mechanisms drives its own sprocket-driving pinion 93 or 93ª, which meshes with a particular endless traction tread. Thereby, by throwing in either clutch 31 or 31ª, at one side of the machine, driving sprocket 93 or 93ª will drive the particular traction tread either forwardly or backwardly as desired.

By simultaneously and selectively throwing in either of the clutch mechanisms 31 or 31ª, at either side of the driving gears 16 and 27, it will be obvious that the machine may be advanced in a straight line either forwardly or backwardly, or one traction tread can be driven either forwardly or backwardly while the other is at rest, or one traction tread can be driven forwardly while the other traction tread is driven backwardly. This it will be seen provides, through the air cylinders, an entirely flexible and mobile distant control for the operation of the machine in taking a load of coal or other material at one point, transporting it to another point and discharging it there.

Referring now to the embodied form of the endless traction tread mechanism, each tread runs over a rear supporting and guiding wheel 109, mounted loosely on an axle or shaft 110, which shaft is mounted at its external end either in the vertical side plate 91 or 92. The inner ends of the respective axles 110 are mounted in the inner vertically-extending and longitudinally-disposed corresponding frame plate 112 or 113, which are fixed to and extend upwardly from the bed plate 1 at either side. The forward supporting and guiding wheels 119, at either side of the machine, are likewise loosely journaled on corresponding shafts 120, supported on one side by the side plates 91, 112 and on the other side by the side plates 92 and 113. A pair of wheels 121 are provided at either side for the respective traction treads, located intermediately of the wheels 109 and 119, primarily for the purpose of holding the bottom reach of the traction tread firmly to the ground. These wheels are loosely mounted respectively on shafts 122, supported in the respective side frames, similarly to the wheels already described.

The preferred specific structure of the endless traction treads and their supporting wheels is shown in Figs. 1, 2, 3 and 12. The wheels are preferably very broad with a plurality of spaced-apart, circular, medial flanges 123. The wheels have suitable roller bearings on their shafts 110.

The endless traction treads themselves consist of links flexibly joined together, having relatively flat tread members 131, and pivotally connected side members 132 pivot pins 133 extending transversely entirely through a set of the pivoted members of the tread (Fig. 12). The flat tread members 131 are some of them provided with inwardly-projecting alining members 135 which cooperate with the circular medial flanges 123 of the wheel, to keep the treads in alinement upon the wheel. If desired, cleaning plates 136 may be provided between the various wheels to strip off all mud or other obstructing matter which may gather thereon when operating in wet places or on soft bottom. Supports 137 may also be provided for the top reach of the respective treads, and constitute braces between the inner and outer side frames.

The double sprocket drive for each of the treads is best shown in Fig. 2, one sprocket being driven, through its clutch, from gear 16 and the other sprocket, through its clutch, being driven from gear 27, as already described. The teeth of the sprocket wheel engage with the bare places 133ª on the pivot pins 133, located intermediately the inner and outer traction-engaging surfaces of the treads, as best shown in Fig. 3. The gearing and drives are connected so that either sprocket for a traction tread in driving draws the tread through or from the other sprocket. That is, for example, in Fig. 2, the sprocket 93 drives in the clockwise direction, at which time the sprocket 93ª rotates idly, and the tread will move its side of the machine in a backwardly direction. The sprocket wheel 93ª in Fig. 2 drives in counter clock-wise direction, at which time the sprocket wheel 93 rotates idly, and the tread drives the machine in the forward direction. In either case, the driving sprocket draws the tread through the other sprocket and thereby avoids any tendency there might be of jamming the tread between the sprockets, thereby impeding or preventing the progress of the machine. The sprocket wheels are beveled inwardly and outwardly from the center of the roots of the sprocket teeth toward the sides and center of the wheel, as best shown in Fig. 5, which renders the wheels self-cleaning as they drive, all mud and dirt being pressed outwardly and away from the wheel.

A flat cover plate 138 is preferably fastened on over the entire machine. Thus all the simple, compact and powerful mechanism is in a closed housing, very close to the floor, and the top hardly higher than the traction treads at either side. The material carrier, or "shovel", projects forwardly from, and extends entirely across the front of the machine, including the treads, and the entire machine moves as a unit or entirety during the pushing into the pile of material to load, the wheeling out of the pile with the load, and the discharge of the load is effected by a pusher blade within the shovel.

The material carrying device, which may conveniently be styled the shovel, comprises a bottom plate 151 and side plates 152 and 153, and the structure may be open at the rear. The shovel is nearly horizontally disposed, and just clears the ground, the front edge touching the ground. It is preferably provided at its forward end with a plurality of hardened points 154 adapted to dig into the material, and to support the shovel upon the ground. These points may be also carried upon the forward side edges of the shovel.

The shovel has no essential movement relatively to the machine so far as the actual work of loading, carrying and discharging the material is concerned, but it is deemed preferable to mount the shovel to have a slight relative motion, whereby it can absorb sudden shocks, such as striking heavy lumps of material, can better accommodate itself to unevennesses in the ground covered, and for other purposes. Accordingly, there is fixed to the respective side plates 152 and 153 rearwardly-extending arms 155, 155ª, which arms at their rear ends are pivotally mounted on the external extensions of the shafts 110 of the rear wheels 109, by means of somewhat elongated slots 156, which permit very slight longitudinal movement of the shovel and eases the brunt of endwise shocks.

The direct thrust and also any tendency to create side twist, incident to driving the shovel into the coal or other material by the forward travel of the machine is transmitted directly from the body of the shovel to the frame of the machine, and is kept away from the arms 155 and 155ª upon which the shovel is mounted. In the embodied form of this means, angle pieces 163 are riveted to the outside, rear bottom edges of the shovel, and play freely in recesses formed in the forward edge of the bed plate 1 of the frame (Figs. 1, 2 and 9). Thus any shock of the shovel is transmitted directly to the main machine frame, and is kept away from the mechanism.

Means are also provided participating in the thrust-absorbing function, and also for preventing buckling or climbing of the machine as the shovel is being driven into the pile of material in the loading operation. For this purpose (Figs. 2 and 9), one or more doubly angled pieces 164 are provided, having the bottom reach 165 of each riveted to the top surface of the inner or rear end of the shovel, and having a vertical reach 166 and an inwardly bent or angled portion 167 at the top, which overhangs the front edge of the bed plate 1 of the machine. In case the front edge of the shovel encounters too great an obstacle for ready removal, and the treads continue to drive the machine forward, the reaches 166 will engage the front edge of bed 1 and transmit the shock directly thereto, and the buckling action will begin between the shovel and the machine proper due to the pivotal mounting of the shovel. The front of the machine proper will rise until the front edge of the plate 1 engages beneath the angled portions 167 of the detents, at practically the inception of the buckling action, and any further tractive effort of the treads will drive the shovel into the work. This permits a somewhat yielding action and still transmits all of the tractive force into driving the shovel forwardly and loading it.

The embodied form of unloading means for the shovel comprises a pusher plate 173, movable to and fro within the shovel, at its retracted position providing a back wall to support the load of material in the shovel, and being movable forwardly to eject the load from the shovel. As embodied, a vertically-disposed and preferably backwardly-slanting plate 173 extends substantially entirely across the shovel but with free clearance therewithin. The bottom end 175 of this plate is preferably curved forwardly to form a bearing or riding surface on the bottom of the shovel. At the top edge of the discharge plate there is preferably an upwardly and forwardly inclined plate 176, fastened to the discharge plate by angle irons 177, this plate preventing the coal or other material from rising and climbing backwardly, and falling over behind the discharge plate.

The actuating means for the discharge plate comprises a cross plate 178, extending horizontally across the central rear part of the discharge plate, and fastened thereto by suitable means such as screw bolts 179. Fixed to or integral with plate 178 are two geared rack bars 180 and 181, extending backwardly and substantially horizontally into the machine, alongside the vertically-disposed inner frame members 112 and 113, and are supported thereon by suitable guiding means.

The means for actuating these geared rack bars 180 and 181, to drive the pusher plate 173, comprise a worm 187, frictionally mounted upon the forwardly-projecting end of the armature shaft 3, so as to turn with the shaft during the usual driving effort, but capable of slipping on the shaft under any sudden or heavy strain. The frictional mounting of this worm on the shaft will, therefore, prevent any stripping of gear or other violent or destructive action in case the discharge plate meets with some heavy obstruction.

As embodied, the worm 187 has an end bearing on a collar 188, loosely encircling the armature shaft 3 between the end of the worm and a shoulder on the shaft. At the other end of the worm 187, a relatively heavy helical spring 189 is coiled about the shaft 3, and is in compression between the end of the worm, and a nut 190, screw-threaded on the end of the shaft 3, preferably with an intervening washer 191. By regulating the pressure of the spring 189, the worm through the intervening connections will drive the shovel discharging plate 174 against any ordinary load, but will prevent damage from overload in the manner already prescribed.

In the embodied form of driving connections from the worm 187 to the shovel discharging plate 173 (Figs. 3, 10, 11, and 12), a worm wheel 197 with its hub 198 encircles a sleeve 199. Sleeve 199 is fixed to a clutch member or jaw 200, and the clutch and sleeve are mounted for free rotation on a shaft 201. Shaft 201 is journaled in bearings 202 and 203 in frame members 204 and 205 mounted upon the bed plate 1. Two pinions 207 and 208 are fixed on and rotate with shaft 201, and these pinions mesh, respectively, with the rack bars 180 and 181, fixed to the shovel discharging blade 173. The rack bars at this point move in supporting and guiding members 209 and 210, which serve to hold them to the pinions 207 and 208, as well as to guide them in their reciprocatory movement. The rack bars have a slight rocking movement about their pinions, so that the pusher blade 173 may ride downwardly on the slanting bottom of the shovel. In this structure, worm wheel 197 rotates freely with the worm 187, the shaft 201 is normally at rest.

The further embodied means for connecting and disconnecting driving worm wheel 197, and driven shaft 201 is preferably adapted for distant control by an air cylinder and conduit cable and controls, as already indicated. For this purpose, a sleeved clutch member or jaw 215 (which cooperates with clutch jaw 200) is mounted on shaft 201, by means of a key 216, to rotate with while having movement along the shaft. To slide clutch sleeve 215 it is provided with a circular groove 217, into which groove project pins upon the upper yoked portion of a lever 218, which lever is pivoted at 219 upon the frame. Pivotally connected to the lower end of lever 218 at 220 is a rod 221, connected to the piston of an air cylinder 222, which cylinder is in connection with the distant control mechanism.

Thus, when the cylinder is under pressure, the clutch members 200 and 215 are thrown in, and the motor, through worm 187 and worm wheel 197, pinions 207 and 208, and gear rack bars 180 and 181 will drive the discharge plate 173 forwardly within the shovel and eject the load of coal or other material therefrom. It is not necessary to mechanically retract the discharge plate 173, as when the shovel is again driven into the pile of coal or other material at the place of supply, clutch 199—215 has been previously disconnected, and the rush of material into the shovel will drive the discharge plate back to a position where it serves as a back wall to the pile of material within the shovel, resting against stop 226.

Means are provided for mechanically throwing out the clutch 200, 215 at the forward end of the stroke of the shovel discharging plate 174. In the embodied form thereof, a stop 227 is fixed on a bar 228, fastened at both of its ends to the underside of the corresponding geared rack bar 181, by means of spacing blocks 229 and screw bolts 230. In the path of the stop 227 (Figs. 6 and 10) at the forward end of its travel, is a bent lever 233, having the end 234 of one arm thereof in position to be moved by the stop 227, and having a pivotal mounting at 235. The other end 236 of the lever abuts on the lever 218 of the clutch mechanism 200, 215. Thus, just as the discharge plate 173 reaches the front end of the shovel, lever 233 is actuated, as described, by stop 237 which is traveling with the discharge plate, and lever 218 is rocked, and the driving clutch 200, 215 is thrown out. The pusher plate is thus disconnected from its forward drive, and is free to be pushed back to the rear end of the shovel by the incoming of the material at the next loading operation as already described.

In Figs. 3, 4, 6 and 9 of the drawings a standard commercial form of air-driven motor is shown, and any other suitable or known form of air or other fluid pressure motor may be employed as found desirable or efficient.

In Figs. 11, 12 and 13, a different form of air motor is shown, which may be used if desired. In this form as embodied, a hollow cylinder 245, having a cylindrical wall 246 and a conical head 247, is mounted within and in fixed relation to a concentric outer cylinder 248. Cylinder 248 has a conical shell 249, surrounding the conical head 247 of the inner cylinder. These two structures are spaced apart and extending across the intervening cylindrical space are a plurality of spaced-apart, helical vanes 250, which may be parallelly arranged or otherwise. Spacing and strengthening lugs 251 are shown in the concentric conoidal portions of the two devices.

At the right-hand end in Fig. 11, a spider 254 is fixed to the cylindrical shell 246 and has a hub 255 concentric therewith.

Fixed in the hub 255 is a shaft 256, by a key 257, and a clamping nut 258. This shaft is journaled by means of a friction sleeve 259 in a bearing 260 formed in a pillow block 261. Key on shaft 256 is a gearwheel or worm 187$^a$, corresponding to the worm 187 in the preceding figures of the drawings. Between the motor cylinder just described and the bearing 260 is a thrust ball-bearing, having race plates 263 and 264 and a series of balls 265. A pipe 267 is concentric with the shaft 256 at the opposite end of the motor. This pipe may be integral with the outer shell of the motor, and may serve both as a supply for the motive pressure fluid and also as one of the bearings for the motor. Pipe 267 is mounted by a friction sleeve 268 in a bearing 269 in a pillow block 270. Pipe 267 extends outwardly beyond the bearing 269, and on this external part is keyed, by means of a key 271, a beveled pinion 4$^a$, corresponding to the pinion 4 in the preceding figure of the drawings. A bearing washer 272 is interposed between the pinion 4$^a$ and the bearing 269, but if desired a ball-bearing such as is shown at the other end of the motor may be used.

For the purpose of supplying the pressure fluid, a pipe 277 is nested within the external end of the pipe 267, and its exterior end is threaded into a joint member 278, having therewithin a conduit 279, this member being supported on a standard 280. A packing gland 281 is provided at the external end of the pipe 267 to insure a fluid-tight joint.

Any suitable form of governor device may be provided for the motor, and it will be obvious that a governor of the ordinary centrifugal type, such as is used in steam engines could be connected to the motor shaft, and could control the supply of pressure fluid to the motor by any suitable type of valve mechanism. As embodied, however, the governor comprises a conical member 285, fixed on a longitudinally-movable shaft 286, mounted within the conical head 247 of the motor. The shaft 286 is longitudinally reciprocable in an orifice in the head plate 287 of the motor cylinder.

Fixed in the shaft 286 is a pin 289, and the opposed protruding ends thereof are engaged by the forked ends 290 and 291 of lever arms 292 and 293, pivoted respectively at 294 and 295 within the conical head of the motor. The other arms 296 and 297 of the two levers have at their outer ends weights 298 and 299, which are movable by centrifugal force correspondingly as a speed of the motor, and will thereby move the conical valve 285 toward and from the pipe 267 to increase or decrease the quantity of pressure fluid supplied to the motor, thereby governing its speed. Leaf springs 300 act to keep valve in its open position by depressing weights 298, 299.

Referring now to the embodied form of the fluid-pressure distant control, it will be understood that it is adapted for use either with fluid-pressure operated motor or with any other type or kind of motor. In the embodied form also (Figs. 14 to 16), the supply of pressure fluid to the motor is carried through, and is controlled from, the stationary distant control, although this is not essential so far as concerns many features of the invention.

As embodied the distant control comprises a plurality of pressure fluid conduits, one for each of the four clutches interposed between the motors and the endless traction treads, and one to control the shovel ejector plate, together with suitable valves, all mounted at the distant control station. In the present embodiment these five pressure fluid conduits are mounted as a unit with the conduit for the motor. A spring winding reel for the assembled conduits is provided, which permits the conduits to pay out as the controlled automotive machine moves away and will wind up the conduits as the automotive machine approaches the station.

In said embodied form, a plurality of pressure fluid pipes 346 (five in number in the present embodiment), are supplied from a common source, and these pipes communicate, respectively, with five concentric circular ducts 302, formed in a stationary, flat circular head 303. The stationary duct plate 303 is fixed to or integral with a concentric pipe 305, which communicates with a pipe 306, supplying pressure fluid to the motor. Positioned at one end of the pressure fluid pipes 346, and at the end opposite the union with the respective stationary concentric ducts 302 are suitable valve mechanisms, having interrelations which will, on the one hand, permit desired plural cooperative actuation of the valves for the different pipes, and which will prevent any other plural operation thereof. These valve mechanisms will be later described.

In direct and fluid-tight contact with the plate 303 is a rotatable, flat, circular plate 310, having a plurality of concentric circular conduits 311. Conduits 311 are in register respectively with the conduits 302, so that each conduit 302 and the corresponding conduit 311 constitute a single continuous circular conduit, one half of which is stationary and the other half of which is rotatable.

The plate 310 constitutes a portion of one end of spring-actuated, conduit reeling and unreeling drum 314. This plate is circularly shouldered into one head of the drum, which head terminates in a conduit-retaining flange 315. A similar flange 316 is formed on the opposite end of the drum cylinder. The plate 310 has an external circular flange 317, and fixed to the external face thereof is a supporting member having a flat, circular flange 318, and projecting outwardly therefrom a cylindrical portion 319, terminating in a flat circular flange 320. This member 319 encircles an outward circular periphery of the stationary duct plate 303, and flange 320 forms a shouldered outward retaining member and seal. The member 319 and the flange 317 of plate 310 are bolted to the flange head 315 of the drum by bolts 321. Gasket rings 322 and 323 are provided to prevent leakage.

The structure just described provides not only pressure fluid communication between the stationary and the rotating parts of the mechanism, but it also provides a mounting for one end of the rotatable drum. The other mounting for the drum, as embodied, comprises a shaft 331, projecting from the opposite head 316 of the drum, and journaled by a friction sleeve 332 in a bearing 333, extending outward from the supporting plate 334 of the frame. The hollow bearing 333 terminates in a cylindrical casing 335, and winding springs 336 have one end fastened to the reduced part 337 of shaft 331 at 338, and the opposite end 339 of the springs are fastened to the casing 335. This unwinding and rewinding structure may be of any suitable or convenient form.

As previously stated, all of the fluid conduits are preferably handled as a unit on the drums and to the automotive machine, and are preferably inclosed in an armored, flexible casing 340 which will prevent compression and pinching of the conduit. There is a diagrammatic representation of the arrangement of the conduits in a single unit at $a$ to Fig. 16. The pipe 305 for the motor pressure fluid is connected to a flexible pipe 345, and each of the concentric ducts 311 communicates with a corresponding flexible pipe 312. These pipes are all combined together as indicated at 340, and pass through an orifice 347 in the cylindrical body of the drum. The entire flexible unit, containing all the pressure pipes, winds onto and unwinds from the drum, as already described.

Referring now to the embodied form of valve mechanism for the respective conduits, a simple valve 351 may be provided in the air pipe for the motor. A simple valve 352 is also provided for the air pipe for the shovel ejector plate. The power is thrown off in this device by the mechanical trip already described. This valve 352 will be provided with a suitable pressure relief, and may be turned off at any time at the convenience of the operator before reloading the shovel.

The valves for the fluid pressure cylinders controlling the clutches for the driving mechanism for the endless treads are interconnected so that the two clutches adapted to drive a particular tread in opposite directions may not be thrown in together, but either of the clutches driving one tread may be thrown in with either of the clutches driving the opposite tread. Thereby, both traction treads may be driven forwardly or backwardly together; or one tread may be driven forwardly while the other is driven backwardly; or, one tread may be driven either forwardly or backwardly while the other tread is at rest.

In the embodied form, the pair of pipes 346a, 346b for the pair of cylinders governing the clutches for one traction tread are controlled by a single valve device, so that both clutches may not be operated together, and the same is true for the two pipes 346 for the opposite traction tread. A description of one of these valve mechanisms will suffice for both.

A pipe 361 supplies pressure fluid into a cylindrical, flat screw cap 362, screwed onto the end of a stationary valve cylinder 363, having a base 364 bolted upon a supporting plate 365 on the machine structure. Within the cylindrical valve member 363 is a tapered, conoidal hole within which is fitted a substantially fluid-tight valve cylinder 367. The member 367 terminates short of the outer end of the hollow cylindrical member 363, leaving an air space 368 therewithin at that end.

In the valve member 367 are formed two separate fluid-pressure conduits or ports 375 and 376, each of which communicates in all positions with the space 368. Two exhaust ports 377 and 378 are positioned in the stationary valve member 363 in alignment with the ports 375 and 376, respectively, but on opposite sides of the entrances to pipes 346. In alignment with exhaust port 377 and port 375, and formed on the periphery of the rotary valve member 367 is a groove or by-pass 379, while a second by-pass 380 is in alignment with the other exhaust port 378 and port 376, but is located on the opposite side of the port 376 from that on which by-pass 379 is located in respect to port 375.

The two pipes 346a and 346b shown in Fig. 17 communicate with the two cylinders controlling one traction tread and the above arrangement of ports and by-passes are such as to allow one clutch cylinder to be under pressure while the other is exhausted. The proportions and positions of the two by-passes are such that either cylinder is relieved of pressure before the other is connected to the source of pressure thus precluding the possibility of the two drive sprockets on one tread being connected to the power simultaneously.

Referring to Figs. 17 and 20, the cylinder connected to pipe 346a is open to the source of pressure through port 375 and is causing the associated parts to drive the tread forward, while the pipe 346b (Fig. 20), communicating with by-pass 380 and exhaust port 378, has exhausted its associated cylinder to its inoperable position, to which position it is urged by the clutch spring previously described.

In Figs. 18 and 21 the operating handle 402 has been rocked to vertical or neutral position causing the ports and by-passes to assume the positions there shown in which both cylinders connected to pipes 346a and 346b are open to exhaust and shut off from pressure. This disconnects both clutches and brings respective tread to a position of rest.

Figs. 19 and 22 show the operating handle 402 rocked still further to the right to a position opposite that shown in Figs. 17 and 20. In this position the pipe 346a has exhausted its cylinder through exhaust port 377 while pipe 346b is connected to space 368 (source of pressure) and permitting the pressure to operate the connected cylinder, said cylinder causing the tread to move backwardly.

The traction tread on the opposite side of the machine is operated through the other distant-control-valve which is substantially the same in construction and operation as the one just described and to which it is operably connected by actuating means now to be described.

In the embodied form of actuating means for the valve, at the end opposite the cap 362, valve member 367 projects from the casing 363, and is provided with a squared head 369. Upon this head is fixedly mounted the hub 370 of a beveled gear sector 371, by which a partial rotation may be imparted to the valve member 367.

The embodied form of actuating means for the two valve mechanisms, cooperating with the beveled gear sectors 371, comprises a gear 401, fixed on a shaft or handle 402, and meshing with both of the sectors 371. The hub of gear 401 is seated on a hollow member 403, which member is rotatably mounted on a transversely-disposed pin 404 fixed in a block 405, which block is bolted on the frame plate 365. The shaft 402 has a head 407 within the hollow member 403. Thus shaft 402 may be rotated to rotate the beveled gear 401, and thereby the geared sectors 371 in opposite directions, or the shaft 402 may be rocked about its axis on the pin 404, to move the bevel gear and both bevel gear sectors in the same directions.

In Fig. 24 is illustrated a modified form of take-up for the air conduit in which the spring take-up drum has been made a separate unit from the valve mechanism. This arrangement allows a simpler valve construction by doing away with the necessity for rotary connection between the control valves and the take-up drum.

As embodied drum 410 is rotatably mounted on a platform 411 and has at one end thereof the take-up-spring housing 412. An ordinary cable 413 is wound on the drum 410 and fastened by a clamp 414 at a point midway on the air conduit 340. As the loading machine moves about in its maneuvers the air conduit between the clamp 414 and the machine is flexibly held taut and out of the path of the machine.

Between the clamp 414 and the valve mechanism the air conduit is in slack coils on the floor and these coils are increased or decreased as the loading machine moves about but they are always out of the way of the said machine.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A distant control for a dirigible, traction-propelled automotive machine having a plurality of traction devices including in combination a distant station, a plurality of fluid pressure conduits extending from the station to the traveling machine, and means at the station including a plurality of interconnected and simultaneously operable valves for controlling the action of the pressure fluid on the mechanism of the automotive machine to forwardly or reversely drive any one of the traction devices irrespective of the drive of the other traction devices.

2. A distant control for a dirigible, automotive machine, including in combination a distant station, a plurality of fluid pressure conduits extending from the station to the traveling machine, traction means on the automotive machine, a motor for driving the traction means, fluid pressure operated means on the machine for controlling the drive of the traction means by the motor, a pressure fluid conduit comprising a single housing containing a plurality of individual conduits between the machine and station, and means including a plurality of interconnected and simultaneously operable valves at the station for controlling said fluid pressure means to actuate and control the direction of motion of the traction means.

3. A distant control for a dirigible, automotive machine including in combination a distant station, a plurality of fluid pressure conduits extending from the station to the traveling machine, traction means on the automotive machine, a motor for driving the traction means, clutches and fluid pressure means for operating the clutches for controlling the drive of the traction means by the motor, a conduit between the automotive machine and the station, and means including valve mechanism at the station for controlling said fluid pressure means to throw in and out the clutches to actuate and control the direction of motion of the traction means to progress the machine forwardly or rearwardly and to steer it over the ground.

4. A distant control for a dirigible, automotive machine having two traction treads including in combination a distant station, a plurality of fluid pressure conduits extending from the station to the traveling machine, traction means on the automotive machine, a motor for driving the traction means, clutches and fluid pressure means for operating the clutches for controlling the drive of the traction means by the motor, a conduit between the automotive machine and the station, and means including a plurality of interconnected valves at the station for controlling said fluid pressure means to throw in and out the clutches to actuate and control the direction of motion of each traction means forwardly or rearwardly irrespective of the actuation and control of the other traction means.

5. A distant control for a dirigible, automotive machine including in combination a distant station, a plurality of fluid pressure conduits extending from the station to the traveling machine, traction means on the automotive machine, a motor for driving the traction means, clutches and fluid pressure means for operating the clutches for controlling the drive of the traction means by the motor, a conduit between the automotive machine and the station, and means including a plurality of interconnected valves simultaneously operable by a single control member at the station for controlling said fluid pressure means to throw in and out the clutches to actuate and control the direction of motion of the traction means.

6. A fluid pressure operated distant control for an automotive machine, including in combination a plurality of pressure fluid conduits, a plurality of valves and connections between the valves whereby only certain predetermined valves may be opened or closed concurrently, a spring reel for reeling and unreeling said conduits as a unit and a duct member for supplying the pressure fluid to the conduits including a station member and a rotatable member together constituting the duct.

7. A distant control for a dirigible, automotive machine including in combination a distant station, a plurality of fluid pressure conduits extending from the station to the traveling machine, traction treads on the machine, a motor for driving the traction treads, fluid pressure clutches for selectively and oppositely controlling the drive of traction means by the motor, means including valve mechanism at the station for controlling the clutches to control the direction of movement of the machine by controlling the drive of the traction treads, and means for preventing the application of oppositely directed driving forces from the motor to a traction tread.

8. A distant control for a dirigible, automotive machine including in combination a distant station, a plurality of fluid pressure conduits extending from the station to the traveling machine, traction treads on the machine, a motor for driving the traction treads, fluid pressure clutches for selectively and oppositely controlling the drive of traction means by the motor, means including valve mechanism at the station for controlling the clutches to control the direction of movement of the machine by controlling the drive of the traction treads, and means at the station for preventing the application of oppositely directed driving forces from the motor to a traction tread.

In testimony whereof, I have signed my name to this specification.

KENNETH DAVIS.